United States Patent [19]

Steenhof et al.

[11] Patent Number: 4,684,986
[45] Date of Patent: Aug. 4, 1987

[54] TELEVISION SIGNAL MEMORY-WRITE CIRCUIT

[75] Inventors: Frits A. Steenhof; Petrus W. G. Welles, both of Eindhoven; Petrus A. C. M. Nuijten, Bergen op Zoom; Jan van der Meer, Eindhoven, all of Netherlands

[73] Assignee: U.S. Philips Corporation, New York, N.Y.

[21] Appl. No.: 730,392

[22] Filed: May 3, 1985

[30] Foreign Application Priority Data

May 3, 1984 [NL] Netherlands .......................... 8401404

[51] Int. Cl.$^4$ .......................... H04N 5/04; H04N 5/14
[52] U.S. Cl. ..................................... 358/148; 358/160
[58] Field of Search ............... 358/148, 150, 160, 320, 358/337; 360/36.1

[56] References Cited

U.S. PATENT DOCUMENTS 4,231,063 10/1980 Ito et al. ............................... 358/148
4,438,456 3/1984 Yoshinaka .......................... 358/148
4,439,786 3/1984 Clayden et al. ..................... 358/148
4,587,557 5/1986 Doornhein et al. .................. 358/11
4,609,947 9/1986 Yamagiwa et al. ................... 360/84

Primary Examiner—James J. Groody
Assistant Examiner—Michael D. Parker
Attorney, Agent, or Firm—Thomas A. Briody; Jack Oisher; William J. Streeter

[57] ABSTRACT

In a television signal memory write circuit which is synchronized by horizontal and vertical synchronizing signal patterns obtained from the television signal to be entered, the mutual positions of these patterns being measured with the aid of a measuring circuit; and depending on this measurement, the vertical synchronizing signal pattern is delayed by a variable delay circuit such that in practice the patterns are prevented from coinciding, thereby preventing a change in the position of a predetermined line number in the television signal memory circuit. This renders the circuit less sensitive to interference.

6 Claims, 12 Drawing Figures

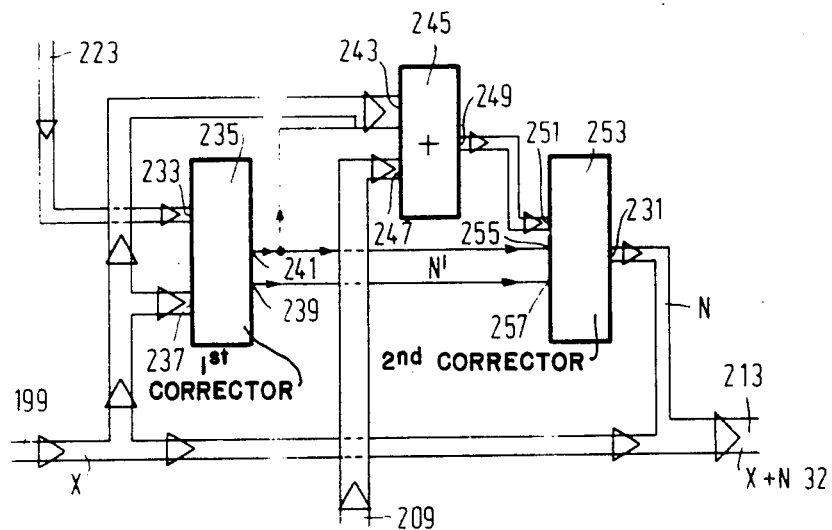
FIG.7
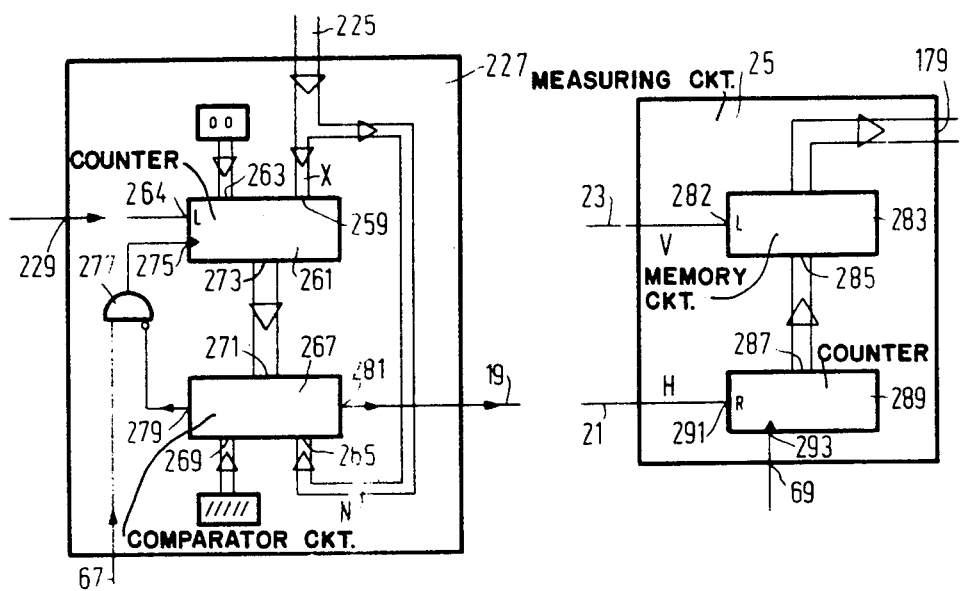
FIG.8
FIG.9

TELEVISION SIGNAL MEMORY-WRITE CIRCUIT

FIELD OF THE INVENTION

The invention relates to a television signal memory-write circuit for writing during horizontal and vertical write periods, respectively the television signal which is coupled to respective horizontal and vertical synchronizing signal patterns derived from a television signal to be entered into a television signal memory circuit. The memory-write circuit comprises a measuring circuit for measuring in each field the mutual positions of said synchronizing signal patterns.

BACKGROUND OF THE INVENTION

Netherlands Patent Application No. 8203668 (PHN10449) discloses a television signal memory-write circuit of the above-defined type. Therein, the television signal memory circuit in which the television signal is to be entered is used for a field frequency doubling circuit. The distance between horizontal and vertical synchronizing signals measured by the measuring circuit is transferred, after having been made suitable therefor, to a read circuit in order to obtain a corresponding position of horizontal and vertical synchronizing signals upon reading the memory circuit. As a result thereof, the circuit becomes insensitive to the occurrence of irregularities in the synchronizing signal patterns such as they may, for example, occur in synchronizing signal patterns derived from television signals originating from video recorders.

When the memory circuit is used in, for example, a picture portion enlarging circuit or a noise suppression circuit in which optionally field frequency doubling is also applied, it has been found that in a displayed picture annoying phenomena in the form of sudden transients or interruptions in the noise suppression may, however, still occur during the processing of television signals received from video recorders.

SUMMARY OF THE INVENTION

The invention has for its object to prevent these annoying phenomena to the best possible extent and to make the write circuit suitable for more general applications.

A write circuit of the type defined in the opening paragraph, is therefore characterized, in that in a vertical synchronization signal path of the write circuit, which path determines the vertical write period, a variable delay circuit a change signal input of which is coupled to an output of the measuring circuit is included for, depending on the mutual positions of the synchronizing patterns measured by the measuring circuit, delaying the vertical synchronizing pattern by means of the delay circuit to such an extent, that the vertical synchronizing signal pattern is prevented from coiciding with the horizontal synchronizing pattern.

Applicants have found that said annoying phenomena are the result of continuous changes in that location in the memory circuit where a television signal originating from a predetermined line number of the television signal to be entered was entered. These changes in the memory locations on entering appeared to be caused by irregularities in the vertical synchronizing signal pattern as compared with the horizontal synchronising signal pattern. The location in the memory circuit where a given line is entered then changes. If, for example, a vertical synchronizing signal continuously changes its location from after to prior to a relevant horizontal synchronizing signal the line number in the memory circuit always increases or decreases by one, which is unwanted. The measure according to the invention can greatly reduce this phenomenon by using the delay circuit to keep sufficiently large the distance between the relevant horizontal and vertical synchronizing signals.

If a simple circuit having a switchable delay is used as a delay circuit, then this is sufficient for the normal display of television signals originating from video recorders.

Upon the display of special television signals, such as, for example, still-picture signals, originating from a video recorder, it often appears necessary to use a further extension of the circuit according to the invention, which is characterized in that the delay produced by the delay circuit can be changed substantially continuously.

Preferably the maximum delay of the delay circuit is then taken to be equal to substantially two line periods, as a result of which even large, not too fast variations in the positions of the vertical synchronizing signals do not cause substantially annoying phenomena.

The invention will now be described in greater detail by way of example with reference to the accompanying drawing.

BRIEF DESCRIPTION OF THE DRAWINGS

FIG. 7 illustrates by means of a block circuit diagram a correction circuit for the embodiment shown in FIG. 6, FIG. 8 illustrates by means of a block circuit diagram a portion of a delay circuit for the embodiment shown in FIG. 7 and FIG. 9 illustrates by means of a block circuit diagram a possible measuring circuit for the embodiment shown in FIG. 1 or FIG. 6.

DETAILED DESCRIPTION OF THE INVENTION

Figure 1:
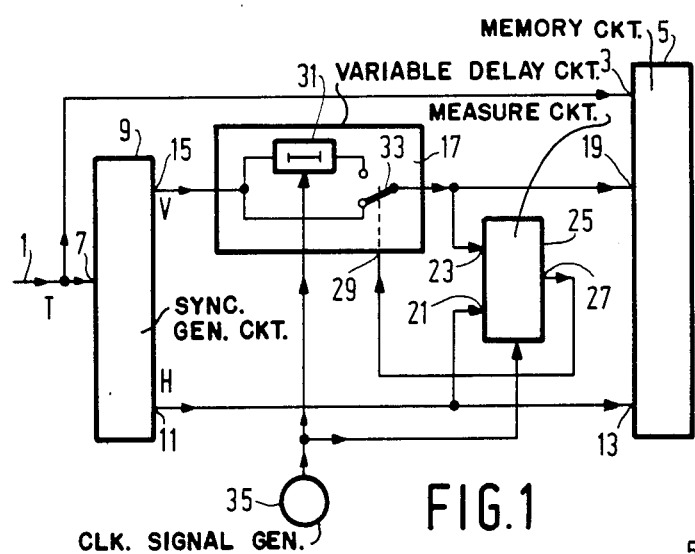
FIG. 1 illustrates by means of a concise block circuit diagram a television signal memory-write circuit according to the invention having a switchable delay.

In FIG. 1 a television signal T is applied to an input 1 of the memory-write circuit. The input 1 is connected to an input 3 of a memory circuit 5 and to an input 7 of a synchronizing signal generating circuit 9.

The memory circuit 5 is, for example, suitable for storing the television signal applied thereto and obtained from a plurality of active lines of a raster of a television picture and may, for example, be used for doubling the field frequency, noise suppression or picture portion enlarging. An example of an application, a write and a read operation of such a memory circuit is published in Netherlands Patent Application No. 8203668. The memory circuit is written-in during horizontal and vertical write periods coupled to a horizontal and vertical synchronizing signal pattern, respectively, of the television signal to be entered. How the memory circuit is read and also details of writing it are not important for an understanding of the invention and will not be described here. An example thereof is disclosed in said Netherlands Patent Application No. 8203668.

The horizontal synchronising signals H of the horizontal synchronising signal pattern are obtained from an output 11 of the synchronizing signal generating circuit 9 and are applied to an input 13 of the memory circuit 5. These signals are, for example, generated by means of a clock signal generator incorporated in a phase-controlled loop followed by a frequency dividing circuit, the phases of an output signal of the frequency dividing circuit and of a horizontal synchronizing signal obtained by means of amplitude selection from the television signal applied to the input 7, being compared. This clock signal generator can then also produce a write clock signal for the memory circuit 5.

The vertical synchronizing signals V of the vertical synchronizing signal pattern are supplied by an output 15 of the synchronizing signal generating circuit 9. These signals can, for example, be obtained by amplitude selection, integration and limiting from the television signal applied to the input 7. They are applied to an input 19 of the memory circuit 5 through a variable delay circuit 17.

Inputs 21 and 23, respectively of a measuring circuit 25 are connected to the respective inputs 13 and 19 of the memory circuit 5. An output 27 of the measuring circuit 25 is connected to a switching signal input 29 of the variable delay circuit 17 and applies thereto a switching signal if too small a spacing is measured between a horizontal and a vertical synchronizing signal or too large a spacing between a vertical and a horizontal synchronizing signal. In the above-mentioned Netherlands Patent Application No. 8203668 a measuring circuit is described, with the aid of which the distance between a vertical and a horizontal synchronizing signal is measured, FIG. 9 illustrates a measuring circuit with the aid of which the distance between a horizontal and a vertical synchronizing signal subsequent thereto can be measured.

The variable delay circuit 17 comprises a delay line 31 and a change-over switch 33, which is operable by the switching signal at the input 29 and by means of which the delay line 31 can be switched or not switched into the signal path between the output 15 of the synchronizing signal generating circuit 9 and the input 19 of the memory circuit 5. The delay line 31 may, for example, be a shift register controlled by a clock signal generator 35. The clock signal generator 35 may also control the measuring circuit 25. The delay produced by the delay line 31 is preferably chosen equal to approximately one quarter of the line period of the television signal T. For the majority of television systems this a approximately 16 usec.

Figure 2:
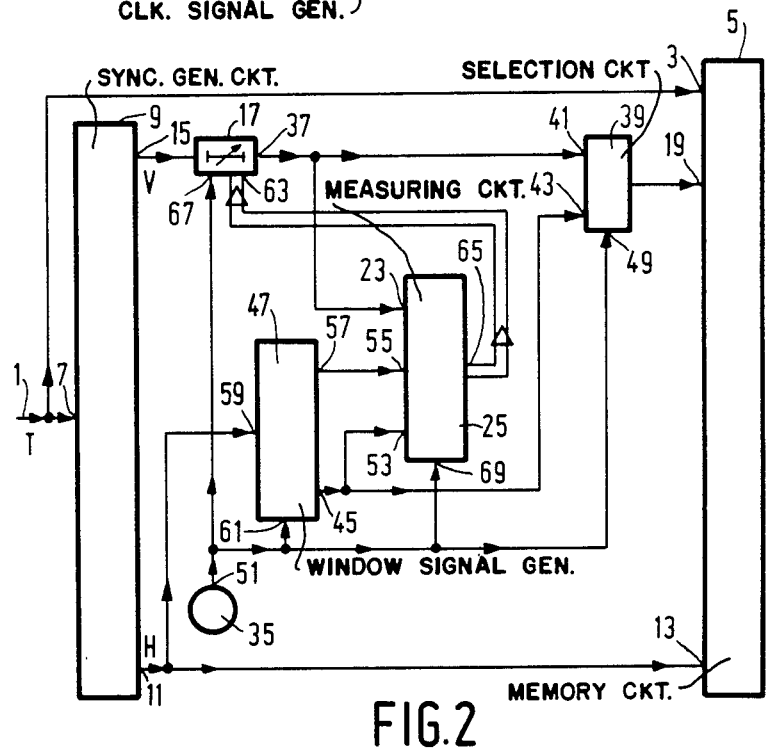
FIG. 2 illustrates by means of a concise block circuit diagram a possible construction of a television signal memory-write circuit having a continuously variable delay according to the invention.

In FIG. 2 and also in the subsequent Figures the same reference numerals are given to corresponding components.

The variable delay circuit 17 and the measuring circuit 25 are of a construction different from those in FIG. 1 and will be described with reference to FIG. 4.

In FIG. 2, a selection circuit 39 an input 41 of which is connected to the output 37 of the delay circuit 17, an input 43 to a window signal output 45 of the window signal generator 47 and a clock signal input 49 to an output 51 of the clock signal generator 35 is further arranged between the vertical synchronizing signal input 19 and an output 37 of the variable delay circuit 17.

The output 45 of the window signal generator 47 is further connected to an input 53 of the measuring circuit 25 a further input 55 of which is connected to an output 57 of the window signal generator 47. An input 59 of the window signal generator 47 is connected to the output 11 of the synchronizing signal generator circuit 9 and a clock signal input 61 is connected to the output 51 of the clock signal generator 35.

An input combination 63 of the delay circuit 17 is connected to an output combination 65 of the measuring circuit 25 and a clock signal input 67 is connected to the output 51 of the clock signal generator 35.

A clock signal input 69 of the measuring circuit 25 is connected to the output 51 of the clock signal generator 35.

The circuit operates as follows.

The window signal generator 47 supplies from its output 45 a window signal which extends some time, for example 8 $\mu$sec, before to some time, for example 8 $\mu$sec, after each horizontal synchronizing pulse. If a vertical synchronizing signal delayed by the delay circuit 17 falls in this window, then the measuring circuit 25 measures the period of time from the beginning of this vertical synchronizing signal to the end of the window. For this measurement an end-of-window signal is used which is applied to the input 55 of the measuring circuit 25. Thereafter, the delay of the delay circuit 17 is increased by the period of time measured. In the meantime, the vertical synchronizing pulse in this selection circuit 39 is replaced by a pulse occurring at the end of the window and derived from the window signal applied to the input 43 of this selection circuit.

Figure 3:
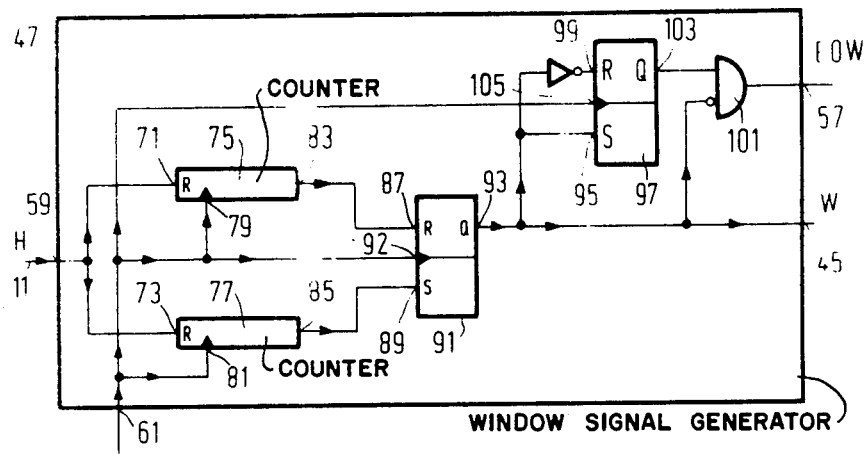
FIG. 3 illustrates by means of a block circuit a window signal generator for the memory-write circuit of FIG. 2.

FIG. 3 shows schematically an embodiment of a window signal generator 47 such as it may be used in the circuit of FIG. 2.

The horizontal synchronizing signal H applied to the input 59 is applied to resetting inputs 71 and 73, respectively, of respective counters 75 and 77. Respective clock signal inputs 79 and 88 of these counters being connected to the clock signal input 61 of the window signal generator 47. On resetting by the horizontal synchronizing signal, outputs 83 and 85 of the respective counters 75 and 77 become low, whereafter the counting position of each of these counters increases in response to the clock signal. After some time, for example 8 $\mu$sec, the output 83 of the counter 75 and after, for example, 56 $\mu$sec the output 85 of the counter 77 become high.

The outputs 83 and 85 of the respective counters 75 and 77 are connected to resetting and setting inputs 87 and 89, respectively of a flip-flop 91, a clock signal input 92 of which is connected to the clock signal input 61 of the window signal generator. This flip-flop 91 now supplies from its output 93 the window signal W which is applied to the output 45 of the window signal generator.

The window signal W is further applied to a setting input 95 of a flip-flop 97 and, in the inverted state, to a resetting input 99 of the flip-flop 97 and to an input of an AND-gate 101, a further input of which is connected to an output 103 of the flip-flop 97. A clock signal input 105 of the flip-flop 97 is connected to the clock signal input 61 of the window signal generator. The flip-flop 97 now supplies from its output 103 the window signal delayed through one clock pulse, as a result of which the AND-gate 101 supplies the end-of-window signal EOW from its output connected to the output 57 of the window signal generator, this supply occurring immediately after the end of the window signal.

Figure 4:
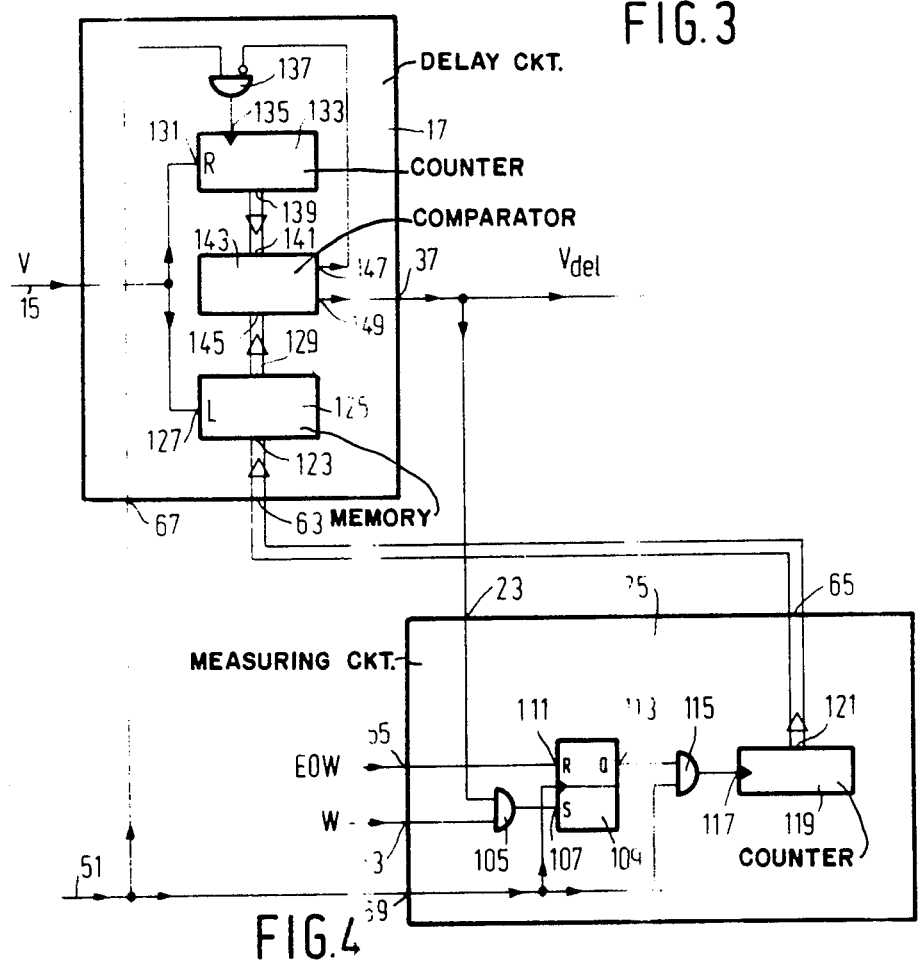
FIG. 4 illustrates by means of a block circuit diagram a delay circuit and a measuring circuit for the memory-write circuit of FIG. 2.

FIG. 4 shows schematically a measuring circuit 25 and a delay circuit 17 having a structure suitable for use in the circuit of FIG. 2.

The vertical synchronizing signal $V_{del}$ delayed by the delay circuit 17, which signal is applied to the input 23 of the measuring circuit 25, is also applied to an input of an AND-gate 105 a further input of which, which is connected to the window signal input 53 of the measuring circuit 25, receives the window signal W.

An output of the AND-gate 105 is connected to a setting input 107 of a flip-flop 109, a resetting input 111 of which is connected to the end-of-window signal input 55 of the measuring circuit 25.

If the delayed vertical synchronizing signal $V_{del}$ falls in the window, the AND-gate conveys this signal to the setting input 107 of the flip-flop 109, which is then set and thereafter, at the end of the window, is reset by the end-of-window signal EOW applied to its resetting input 111. The output 113 of the flip-flop 109, which is connected to an input of an AND-gate 115 is then in the high state from the beginning of the delayed vertical synchronizing signal $V_{del}$ to the end of the window. During that period of time, the AND-gate 115 conveys the clock pulses, which are applied to its other input and were received from the clock signal input 69 of the measuring circuit 25, to a clock signal input 117 of a counter 119, which input is connected to the output of this measuring circuit. In response thereto, the counting position of this counter 119 is increased by the number of clock signal pulses occurring between the beginning of the delayed synchronizing signal $V_{del}$ and the beginning of the end-off-window signal EOW.

The counting position of the counter 119 is transferred from the output combination 65, connected to an output combination 121 of the counter 119, of the measuring circuit 25 to the input combination 63 of the delay circuit 17 and applied to an input combination 123, connected to the input combination 63, of a memory circuit 125 which stores this counting position at the occurrence of a subsequent vertical synchronizing signal at its write command signal input 127 connected to the input 15, and applies it to its output combination 129.

The input 15 for the vertical synchronizing signal V is further connected to a resetting input 131 of a counter 133, of which a clock signal input 135 is connected to an output of an AND-gate 137 and an output combination 139 to an input combination 141 of the comparator circuit 143. A further input combination 145 of the comparator circuit 143 is connected to the output combination 129 of the memory circuit 125.

The comparator circuit 143 supplies from an output 147 a signal which is low for the period of time in which the value applied to its input combination 141 is smaller than the value applied to the input combination 145. Then, the signal at this output 147 adjusts through an inverting input of the AND-gate 137 connected to this output this AND-gate 137 to the conducting state during the occurrence of further clock pulses applied to a further input of the AND-gate 137 and originating from the clock signal input 67 of the delay circuit 17, which clock pulses then increase the counting position of the counter 133 from zero to a value corresponding to the value at the input combination 145 of the comparator circuit. At that instant an output 149 of the comparator circuit 143 supplies the delayed vertical synchronizing signal $V_{del}$ from the output 37 of the delay circuit 17.

A counter having a maximum counting position which at least corresponds to a line period is preferably used for the counter 119 of the measuring circuit 25.

Figure 5:
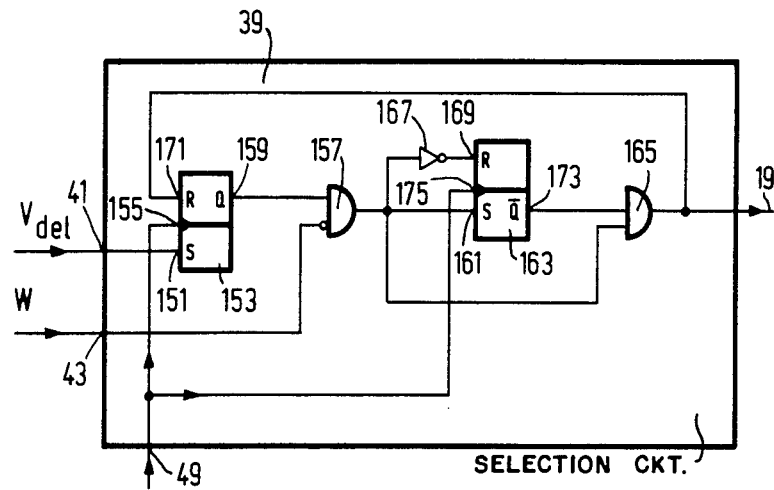
FIG. 5 illustrates by means of a block circuit diagram a selection circuit for the memory-write circuit of FIG. 2.

Since the delay circuit 17 only increases the delay of the subsequent vertical synchronizing pulse and the newly-set delay must already be active for the above-described delayed vertical synchronzing pulse falling in the window, the selection circuit 39 is provided, of which FIG. 5 shows a feasible construction.

In FIG. 5 the input 41 of the selection circuit 39 is connected to a setting input 151 of a flip-flop 153. A clock signal input 155 of the flip-flop 153 is connected to the clock signal input 49 of the selection circuit 39. The flip-flop 153 is set by the first clock pulse produced after the beginning of the delayed vertical synchronizing signal, in response to which an output 159, which is connected to an input of an AND-gate 157, of the flip-flop 153 is adjusted to the high state. The window signal which is received from the input 43 of the selection circuit 39 and which cuts off the AND-gate 157 during the occurrence of the window signal, is applied to an inverting further input of AND-gate 157. So when the delayed vertical synchronizing signal $V_{del}$ falls in the window, the output of the AND-gate 157 does not become high until the first clock pulse after the end of the window signal has occurred. If the vertical synchronizing signal $V_{del}$ does not fall in the window then the output of the AND-gate 157 is adjusted to the high state at the occurrence of the first clock pulse after the beginning of the signal $V_{del}$.

The output of the AND-gate 157 is connected to a setting input 161 of a flip-flop 163, to an input of an AND-gate 165 and through an inverter 167 to a resetting input 169 of the flip-flop 163 an inverted output 173 of which is connected to a further input of the AND-gate 165. The output of the AND-gate 165 is connected to a resetting input 171 of the flip-flop 153 and to the output 19 of the selection circuit.

The last of the two input signals of the AND-gate 157 which is adjusted to the high state sets the flip-flop 163, whose output 173 is adjusted to the low state in response to the subsequent clock pulse applied to a clock signal input 175 of the flip-flop 163 connected to the clock signal input 49 of the selection circuit 39, so that the output of the AND-gate 165 is only high during this clock pulse. In response to the then subsequent clock pulse the flip-flop 153 is reset by the output signal of the AND-gate 165, causing the AND-gate 157 to be rendered non-conductive and the flip-flop 163 to be reset in response to the subsequent clock pulse.

So a pulse occurs at the output 19 of the selection circuit 39 at the start of the occurrence of the signal $V_{del}$ or, when this starts falls in the window, at the end of the window signal W.

It will be obvious that instead of the always uni-directionally counting counter 119 a counter counting in the other direction or in both directions may optionally be used, provided the further portions of the circuit are adapted thereto.

Figure 6:
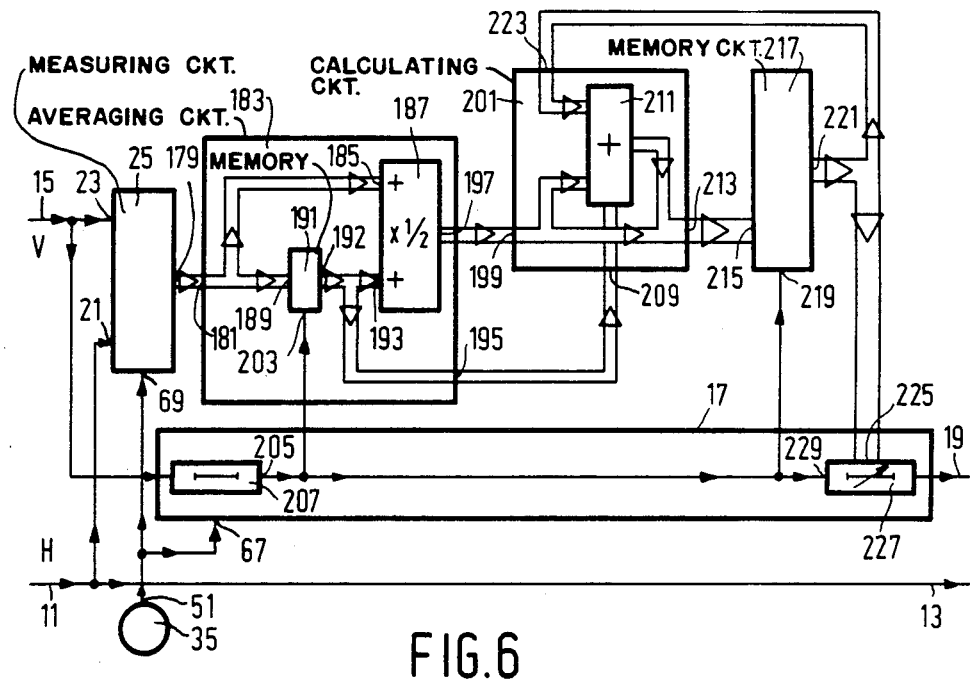
FIG. 6 illustrates by means of a concise block circuit diagram a different possible embodiment of a television signal memory-write circuit according to the invention.

In FIG. 6 the measuring circuit 25 is directly connected by means of its input 23 for the vertical synchronizing signal to the output 15 of the synchronizing signal generating circuit 9, not shown. The measuring circuit 25 which will be described in detail with reference to FIG. 9, supplies at each occurrence of a vertical synchronizing signal from an output combination 179 a value representing the time spacing between this vertical synchronizing signal and the preceding horizontal synchronizing signal. In this case this value is measured in six bits, so modulo-64. Let it be assumed that the clock signal frequency coupled to the write clock signal frequency of the memory circuit 51 is 1 MHz and the line period has a duration of 64 μsec.

The output combination 179 of the measuring circuit 25 is connected to an input combination 181 of an averaging circuit 183, which is connected to an input combination 185 of an adder and divider circuit 187 and to an input combination 189 of a memory circuit 191. An output combination 192 of the memory circuit 191 is connected to a further input combination 193 of the adder- and divider circuit 187 and to an output combination 195 of the averaging circuit 183. An output combination 197 of the adder and divider circuit 187 is connected to an input combination 199 of a calculation circuit 201.

The memory circuit 191 has a write signal input 203 which is connected to an output 205 of a portion 207, which produces a fixed delay of two μsec, of the delay circuit 17. As a result thereof, during these two μsecs the values of the time spacing between the present and the previous vertical synchronizing signals relative to their preceding horizontal synchronizing signal are available during these two μsecs at the input combinations 185 and 193 of the adder circuit 187. The adder and divider circuit 187 adds these values together and divides them by two. The five least significant bits of this adding and dividing operation, which consequently is effected modulo-32, are applied by the output combination 197 to the input combination 199 of the calculation circuit 201 during said two μsecs.

In addition, the calculation circuit 201 receives at an input combination 209 connected to the output combination 195 of the averaging circuit 183, in six bits, so modulo-64, during said two μsec, the value of the distance of the previous vertical synchronizing signal relative to the horizontal synchronizing signal preceding it. The calculation circuit 201 comprises a correction circuit 211, which adds further two most significant bits to the five least significant bits originating from the input combination 199, so that at the end of said two μsecs a calculated value, expressed by seven bits, is available at an output combination 213 of the calculation circuit 201. This calculated value is applied to an input combination 215 of a memory circuit 217 which as a consequence of a write signal fed to its write signal input 219, which write signal is obtained from the output 205 of the fixed delay 207, at the end of said two μsecs stores the value which is calculated by the calculation circuit 201 and corresponds to said desired delay of the delay circuit 17, and makes it available in seven bits at an output combination 221 of the memory circuit 217. The three most significant bits of these seven bits are fed back to an input combination 223 of the calculation circuit 201.

The output combination 221 of the memory circuit 217 is connected to an input combination 225 of a variable portion 227 of the delay circuit 17, an input 229 of which is connected to the output 205 of the fixed portion 207. This causes the desired delay of this variable portion to be adjusted, so that the vertical synchronizing signal is applied with the desired time delay to the input 19 of the television signal memory 5, not shown.

To determine the desired delay such as it is produced with the aid of the value calculated by the calculation circuit 201 whose correction circuit 211 is shown schematically in FIG. 7, the following considerations apply.

So as to ensure that the vertical synchronizing signal cannot pass the corresponding horizontal synchronizing signal in the case of a variation in the position of the vertical synchronizing signal in the vertical synchronizing pattern, it is advantageous to render the delay produced by the delay circuit 17 such that the average positions of the vertical synchronizing signals in the horizontal synchronising signal pattern are located symmetrically relative to the relevant surrounding horizontal synchronizing signals or relative to the centres thereof. For ideal, interlaced pictures one vertical synchronizing signal then appears 16 μsecs before the start or before the centre of a line period and the subsequent vertical synchronizing signal appears 16 μsec after the start or the centre of a line period. For ideal, non-interlaced pictures all the vertical synchronizing signals become then located in the centre of a line period.

The maximum adjustable delay of the delay circuit 17 must be sufficient large to ensure that there are the fewest possible sudden transitions in the positions of the television signal to be entered into the television signal memory circuit 5. Tow line periods were found to be an advantageous value.

At the limits of the control range of the delay circuit 17 and when a distance measured between a horizontal and vertical synchronizing signal appears to be in the region from 0 to 64 μsecs, such a decision must be taken for a new setting of the delay circuit that it agrees to the best possible extent with the previous setting.

In FIG. 7 the average modulo thirty-two value of the distance between two consecutive vertical synchronizing signals and their preceding horizontal synchronizing signals are applied in five bits to the input combination 199. The correction circuit 211 supplies to an output combination 231 a value of two bits which are the most significant bits of the signal combination supplied in the output combination 213 of the calculation circuit 201. The five least significant bits of this signal combination are the five bits of the signal combination applied to the input combination 199.

Let X be the value of the signal combination at the input combination 199 and N the value of the signal combination at the output combination 231, then the value of the signal combination at the output combination 213 is equal to (X+N.32), from which the desired delay of the delay circuit can be determined, which then is (N+1)32-X. This last expression is obtained in the variable portion 227 of the delay circuit 17 from the X and N values of the value (X+N.32) at the output combination 213 such as it is entered into the memory circuit 217 through its input combination 215.

To calculate the value N, use is made of the three most significant bits of the output signal combination of the memory circuit 217 which represents the previous calculated value $X_{prev}+N_{prev}\cdot 32$. The value of these three bits is $N_{prev}\cdot 32+Y\cdot 16$, where Y is the most significant bit of $X_{prev}$.

The value N+1 determines in which fourth part of the maximum time delay of 128 μsecs the desired time delay must be located and consequently the value N determines in which fourth part of 128μsecs the value at the output combination 213 must be located.

The input combination 223 of the calculation circuit 201 is connected to an input combination 233 of a first corrector 235, a further input combination 237 of which is connected to the input combination 199 of the calculation circuit 201.

The first corrector 235 supplies to two outputs 239, 241 a value N' which is equal to $N_{prev}$ when $8 \leq X \leq 23$ is independent of the value of $N_{prev}\cdot 32+Y\cdot 16$ For other values of X, N' is chosen in accordance with the following Table:

| | $N_{prev} \cdot 32 + Y \cdot 16$ | | | | |
|---|---|---|---|---|---|
| | 0 to 15 | 16 to 47 | 48 to 79 | 80 to 111 | 112 to 127 |
| $0 \leq X \leq 7$ | N' = 0 | N' = 1 | N' = 2 | N' = 3 | N' = 2 |
| $24 \leq X \leq 31$ | N' = 1 | N' = 0 | N' = 1 | N' = 2 | N' = 3 |

Herein: $N_{prev} \cdot 32 + Y \cdot 16$, so
000 for 0 to 15
001 or 010 for 16 to 47
011 or 100 for 48 to 79
101 or 110 for 80 to 117
111 for 112 to 127.

The least significant bit of N' at the output 241 of the first corrector 235 is applied, together with the signal combination X originating from the input combination 199 of the calculation circuit 201, to an input combination 243 of an adder circuit 245, a further input combination 247 of which receives the modulo-64 value $V_{prev}$ of the previously measured distance between the vertical signal and the synchronizing signal preceding it, which value was applied to the input combination 209 of the calculation circuit 201.

The adder circuit 245 supplies to its output combination 249 the two most significant bits of a modulo-64 sum, i.e. $(V_{prev}+(N'\cdot 32+Y\cdot 16)_{mod\ 64})_{mod\ 64}$.

This value is applied to an input combination 251 of a second corrector 253, whose further inputs 255 and 257, respectively are connected to the respective outputs 241 and 239 of the first correction circuit 235.

When the value of the input signal combination at the input combination 251 assumes one of the values from eight to fifty-five, inclusive, the signal at the inputs 255, 257 is conveyed without any change to the output combination 231 of the correction circuit 211 which at the same time constitutes the output combination of the second corrector 253.

If the value of the input signal combination at the input combination 251 assumes one of the values from zero to seven, inclusive or fifty-six to sixty-three, inclusive, the N' is incremented by one for N'=0 or one and decremented by one for N'=two or three.

In FIG. 8, at the instant at which the vertical synchronizing signal delayed through 2 μsec enters through the input 229 of the variable portion 227 of the delay circuit 17, the newly calculated value of X+N·32 becomes available at the input -combination 225. The five least significant bits represent the value X are applied to an input combination 259 of a seven-bit counter 261 to a further input combination 263 of which the value 00 is applied as the two most significant bits. A write signal input 264 of the counter 261 is connected to the input 229 of the variable portion 227 so that the counting position is made equal to X at the occurrence of the vertical synchronizing signal at this input 265.

The two most significant bits N of the input signal combination at the input combination 225 of the variable portion 227 are applied to an input combination 265 of a comparator circuit 267, to a further input combination 269 of which the value (32−1)=11111 is applied as the least significant bits, so that these input combinations 265, 269 together receive a calue (N+1)·32−1. This value is compared with a value of a counting position applied to a seven-bit input combination 271 and originating from a seven-bit output combination 293 of the counter 261, which counting position increases in response to a clock signal applied to a clock signal input 275 of the counter 261 and originating from an AND-gate 277, until an output 279 of the comparator circuit 267, which output is connected to an inverting input of the AND-gate 277, is adjusted to the one state. A further input of the AND-gate 277 is connected to the clock signal input 67 of the delay circuit 17.

The output 279 of the comparator circuit 267 becomes one as soon as the value of the counter position exceeds (N+1)·32−1, so at the counter position (N+1)32. A vertical pulse which is delayed by a desired value (N+1)·32 1−X is then applied to an output 281 of the comparator circuit 267 connected to the input 19 of the television signal memory circuit 5, since the counter 261 has counted to the value (N+1)32 from the value X.

In FIG. 9, which illustrates schematically a possible construction of the measuring circuit 25, the vertical synchronizing signal V is applied from the input 23 to a write signal input 282 of the memory circuit 283, an input combination 285 of which is connected to an output combination 287 of a counter 289. In response thereto, the position of the counter 289 is stored in the memory circuit 283 at the instant at which the vertical synchronizing signal V occurs. The counter 289 has a resetting input 291 which is connected to the input 21 of the measuring circuit 25. As a result thereof, the counting position is reset to zero at each occurrence of the horizontal synchronizing signal H. In response to the clock signal applied to an input 293 of the counter 289, which input is connected to the input 69 of the measuring circuit 25, the counting position continuously increases thereafter. So the time distance between the vertical synchronizing signal and the horizontal synchronizing signal preceding it are stored in the memory circuit 283.

It will be obvious that, if so desired, the measuring circuit may alternatively be of such a structure that measurements are effected from the vertical synchronizing signal to one of the subsequent horizontal synchronizing signals, when the remaining portion of the write circuit is adapted thereto.

If so desired, the calculation circuit 201 can be arranged such that the desired time delay is calculated therewith, so that the variable portion 227 of the delay circuit 17 may be of a simpler construction.

In addition, it is optionally possible to apply the difference between the values occurring at the input combinations 185 and 189 of the adder and dividing circuit 187 to the calculation circuit, instead of the measured distance between the previous vertical synchronizing signal and the horizontal synchronising signal preceding it. This will also give an indication whether the position of one of the two subsequent vertical synchronizing signals is too close to a horizontal synchronizing signal preceding it.

Figure 10:
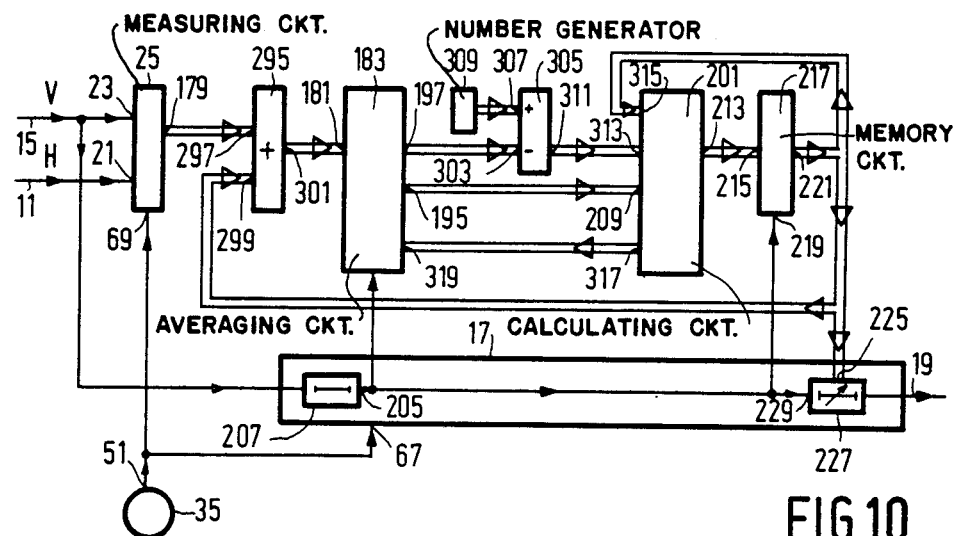
FIG. 10 illustrates by means of a concise block circuit diagram a further possible embodiment of a television signal memory-write circuit according to the invention.

In FIG. 10 an adder circuit 295, an input combination 297 of which is connected to the output combination 179 of the measuring circuit 25, is arranged between the input combination 181 of the averaging circuit 183 and the output combination 179 of the measuring circuit 25. A further input combination 299 of the adder circuit 295 then receives from the output combination 221 the desired delay calculated by the calculation circuit 201.

At output combination 301 of the adder circuit 295 there then appears a signal combination which is the sum of the measured value of the time distance between a vertical synchronizing signal and the preceding horizontal synchronizing signal and the previous calculated value of the delay. This sum is applied modulo-64 to the input combination 181 of the averaging circuit 183 and indicates at which distance from a horizontal synchronizing signal the vertical synchronizing signal would be located when it were delayed by the calculated delay.

The averaging circuit 183 now supplies from its output combination 197 the average value of the distance between two consecutive vertical synchronizing signals delayed by a calculated time delay, relative to the preceding horizontal synchronizing signals. This average value, which is determined modulo-64, is applied to an input combination 303 of a subtracting circuit 305. A further input combination 307 of this subtracting circuit receives a signal combination representing the number thrity from a number generator 309. An output combination 311 of the subtracting circuit 305 now applies a signal combination indicating the amount by which the delay of the delay circuit 17 must be changed to obtain the average position of the vertical synchronizing signals halfway between two horizontal synchronizing signals. This signal combination is now applied to an input combination 313 of the calculation circuit 201 which calculates with the aid of this value the desired time delay of the variable portion 227 of the delay circuit 17 and supplies this time delay to its output combination 213.

The calculation circuit 201 has a further input combination 315 to which the previously calculated delay value is applied from the output combination 221 of the memory circuit 217 during the two μsecs in which the calculation of a new time delay is effected.

In that case the input combination 209 of the calculation circuit 201 receives from the output combination 195 of the averaging circuit the difference between the distances of two consecutive vertical synchronizing signals delayed by the calculated delay relative to their preceding horizontal synchronizing signals, whilst an output combination 317 of the calculation circuit 201 supplies from an input combination 319 of the averaging circuit 183 a value representing the calculated correction necessary for the new time delay of the previously calculated time delay present at the output combination 311.

Figure 11:
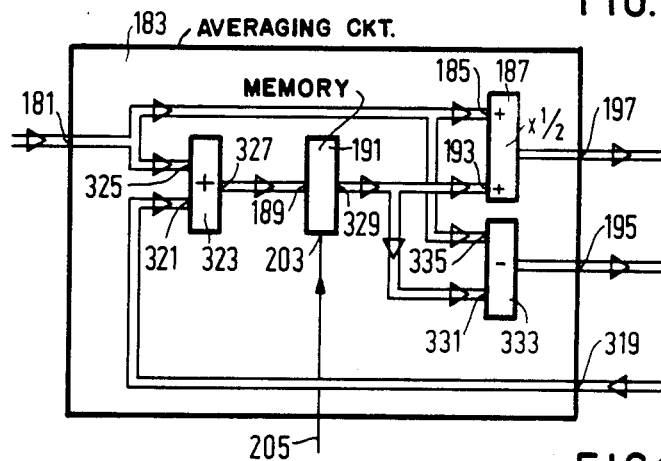
FIG. 11 illustrates by means of a block circuit diagram an averaging circuit for the embodiment shown in FIG. 10.

In FIG. 11 this calculated correction value of the input combination 319 of the averaging circuit 183 is applied to an input combination 321 of an adder circuit 323 to a further input combination 325 of which the value of the distance of the vertical synchronizing signal to its preceding horizontal synchronizing signal, which distance is delayed by the previously calculated time delay stored in the memory circuit 217, is applied. The sum of these values is applied from an output combination 327 of the adder circuit 323 to the input combination 189 of the memory circuit 191 and is stored therein.

The value stored in the memory circuit 191 is applied through an output combination 329 to the input combination 193 of the adder and divider circuit 187 and to an input combination 331 of a subtracting circuit 333. A further input combination 335 of the subtracting circuit 333 is connected to the input combination 181 of the averaging circuit 183.

Now the value of the measured distance of the vertical synchronizing signal to the preceding horizontal synchronizing signal, which measured distance is corrected by the previously calculated value of the delay, is available at the input combinations 185 and 335 of the adder and divider circuit 187 and the subtracting circuit 333, respectively and the value of the measured distance between the previous vertical synchronizing signal to the horizontal synchronizing signal preceding it, which value is corrected by the same delay, is available at the input combinations 193 and 331, respectively of the adder and divider circuit 187 and the subtracting circuit 333, respectively.

The adder and divider circuit 187 supplies from the output combination 197 the average value of these input signal combinations and the subtracting circuit 333 supplies from the output combination 195 the absolute value of the difference thereof.

Figure 12:
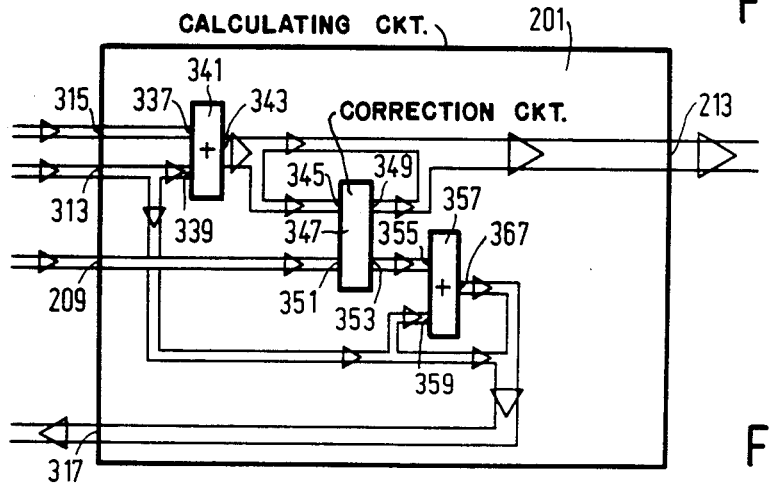
FIG. 12 illustrates by means of a block circuit diagram a calculation circuit for the embodiment shown in FIG. 10.

In FIG. 12 the input signal combinations at the input combinations 315 and 313 of the calculation circuit 201 are applied to the respective input combinations 337 and 339 of an adder circuit 341. These signal combinations represent the previously calculated time delay and the delay correction value determined in the subtracting circuit 305, respectively. The adder circuit 341 then supplies from its output combination 343 the new value of the desired delay in nine bits, whose four most significant bits are applied to an input combination 345 of the correction circuit 347 and the five least significant bits are directly applied to the output combination 213, which further receives the two most significant bits of the newly calculated delay value from an output combination 349.

To determine these two most significant bits the correction circuit 347 further utilizes the differential value applied to its input combination 351 and originating from the input combination 209 of the calculation circuit 201.

In addition, the correction circuit 347 supplies from an output combination 353 a three-bit signal combination which is applied to an input combination 355 of an adder circuit 357, a further input combination 359 of which receives the two most significant bits of the delay correction value from the input combination 313. The remaining five, least significant, bits are combined with the three bits which serve as the most significant bits and are supplied by the output combination 367 of the adder circuit 357 and applied to the output combination 317 of the calculation circuit 201 as the delay correction value required at the input combination 319 of the averaging circuit 183.

The operation of the correction circuit 347 is in accordance with the following Table in which for a value exceeding forty-eight at the input combination 351 a logic value one is specified and a logic value zero for a value less than or equal to forty-eight. The signal combinations at the input combinations 345 and 353 are written in a two's complement notation.

| Input combination 345 | Input combination 351 | Output combination 353 | Output combination 349 |
|---|---|---|---|
| 1110 | 0 | 010 +64 | 00 |
| ≦ −33 | | | |
| 1110 | 1 | 011 +96 | 01 |
| 1111 | 0 | 010 +64 | 01 |
| ≧ −32 | | | |
| 1111 | 1 | 011 +96 | 10 |
| 0000 | 0 | 000 0 | 00 |
| ≧ 0 | | | |
| 0000 | 1 | 001 +32 | 01 |
| 0001 | 0 | 000 0 | 01 |
| ≧ 32 | | | |
| 0001 | 1 | 001 +32 | 10 |
| 0010 | 0 | 000 0 | 10 |
| ≧ 64 | | | |
| 0010 | 1 | 110 −32 | 01 |
| 0011 | 0 | 000 0 | 11 |
| ≧ 96 | | | |
| 0011 | 1 | 110 −32 | 10 |
| 0100 | 0 | 101 −64 | 10 |
| ≧ 128 | | | |
| 0100 | 1 | 100 −96 | 01 |

The variable portion 227 of the delay circuit 17 may now be a down-counter whose counting position at the instant at which the vertical synchronizing signal delayed by 2 μsec at its input 229 is made equal to a calculated delay value applied to its input combination 225 and which thereafter counts down to zero and then supplies a delayed vertical synchronising signal from its output 19.

The clock signal generator 35 comprised in the embodiments is synchronized with the horizontal synchronizing signals and may form part of the synchronizing signal generating circuit 9.

What is claimed is:

1. In a television signal memory-write circuit for writing a television signal coupled to respective horizontal and vertical synchronizing signal patterns during respective horizontal and vertical write periods, the patterns being derived from a television signal to be entered into a television signal memory circuit having a measuring circuit for measuring in each field mutual positions of the synchronizing signal patterns, the memory-write circuit comprising:
   a variable delay circuit located within a vertical synchronizing signal path, the path determining the vertical write periods, a signal input of the delay circuit being coupled to an output of the measuring circuit for, depending on the mutual positions of the synchronizing signal patterns measured by the measuring circuit, delaying the vertical synchronizing signal pattern, thereby preventing the vertical synchronizing signal pattern from coinciding with the horizontal synchronizing pattern.

2. The memory-write circuit as claimed in claim 1 wherein the delay circuit changes substantially continuously the delay produced thereby.

3. The memory-write circuit as claimed in claim 2, wherein the delay produced by the delay circuit has a maximum of approximately two line periods.

4. The memory-write circuit as claimed in claim 2 or 3, further comprising:
   a first input of the measuring circuit being coupled to an output of the delay circuit;
   a window signal generator having an output coupled to a second input of the measuring circuit, the generator being controlled by the horizontal synchronizing signal pattern for generating a window signal pattern;
   wherein the measuring circuit changes the delay produced by the delay circuit only when the vertical synchronizing pattern coincides with the window signal pattern.

5. The memory-write circuit as claimed in claim 2 or 3 further comprising:
   an averaging circuit having an input coupled to the output of the measuring circuit for averaging two consecutive values measured by the measuring circuit;
   a calculation circuit having a first input connected to an output of the averaging circuit;
   a first memory circuit connected to the calculation circuit, the first memory circuit having an output connected to a change signal input of the delay circuit, the first memory circuit further having a second output coupled to a second input of the calculation circuit; and
   a second memory circuit for connecting the measuring circuit to a third input of the calculation circuit.

6. The memory-write circuit as claimed in claim 5, further comprising:
   an adder circuit having an input coupled to the output of the measuring circuit, the adder circuit further having a second input coupled to a third output of the first memory circuit and an output connected to the averaging circuit;
   a subtracting circuit having a first input connected to the averaging circuit and an output connected to the calculation circuit, the subtracting circuit further having a second input for accepting a number representing a desired average position of the delayed vertical synchronizing signal pattern.

* * * * *